US007826129B2

(12) United States Patent  (10) Patent No.: US 7,826,129 B2
Wu et al.  (45) Date of Patent: Nov. 2, 2010

(54) MATERIALS FOR USE IN ELECTROPHORETIC DISPLAYS

(75) Inventors: Bin Wu, Sharon, MA (US); Charles Howie Honeyman, Roslindale, MA (US); George G. Harris, Woburn, MA (US); Stephen P. Dudek, San Francisco, CA (US); Anthony Zalesky, Somerville, MA (US); Richard J. Paolini, Jr., Framingham, MA (US); Craig A. Herb, Medford, MA (US)

(73) Assignee: E Ink Corporation, Cambridge, MA (US)

( * ) Notice: Subject to any disclaimer, the term of this patent is extended or adjusted under 35 U.S.C. 154(b) by 14 days.

(21) Appl. No.: 12/043,472

(22) Filed: Mar. 6, 2008

(65) Prior Publication Data

US 2009/0109519 A1 Apr. 30, 2009

Related U.S. Application Data

(60) Provisional application No. 60/893,226, filed on Mar. 6, 2007.

(51) Int. Cl.
G02B 26/00 (2006.01)
G09G 3/34 (2006.01)
G03G 17/04 (2006.01)
(52) U.S. Cl. .......................... 359/296; 345/107; 430/32
(58) Field of Classification Search ................. 359/296; 345/107; 430/32; 204/600
See application file for complete search history.

(56) References Cited

U.S. PATENT DOCUMENTS

| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |

(Continued)

FOREIGN PATENT DOCUMENTS

EP  1 099 207 B1  3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner*—William C Choi
(74) *Attorney, Agent, or Firm*—David J. Cole

(57) ABSTRACT

An electrophoretic medium comprises an electrophoretic layer, a layer of lamination adhesive and a polymeric layer disposed between the electrophoretic layer and the lamination adhesive layer, the polymeric layer being impermeable to the fluid. A second form of electrophoretic medium has a layer of a complex of an alkali metal and a polymer in contact with the electrophoretic layer. A third form of electrophoretic medium comprises a plurality of discrete droplets of internal phase in a binder, and further comprises a salt.

14 Claims, 5 Drawing Sheets

U.S. PATENT DOCUMENTS

| | | |
|---|---|---|
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,365,900 B2 * | 4/2008 | Yamamoto .................. 359/296 |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,339 B2 | 2/2009 | Amundson |
| 7,492,497 B2 | 2/2009 | Paolini, Jr. et al. |
| 7,513,813 B2 | 4/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 7,583,427 B2 | 9/2009 | Danner et al. |
| 7,598,173 B2 | 10/2009 | Ritenour et al. |
| 7,602,374 B2 | 10/2010 | Zehner et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |

| | | |
|---|---|---|
| 2005/0018273 A1 | 1/2005 | Honeyman et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0253777 A1 | 11/2005 | Zehner et al. |
| 2005/0259068 A1 | 11/2005 | Nihei et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2007/0013683 A1 | 1/2007 | Zhou et al. |
| 2007/0035532 A1 | 2/2007 | Amundson et al. |
| 2007/0052757 A1 | 3/2007 | Jacobson |
| 2007/0057908 A1 | 3/2007 | Jacobson |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0109219 A1 | 5/2007 | Whitesides et al. |
| 2007/0146310 A1 | 6/2007 | Paolini, Jr. et al. |
| 2007/0152956 A1 | 7/2007 | Danner et al. |
| 2007/0153361 A1 | 7/2007 | Danner et al. |
| 2007/0200874 A1 | 8/2007 | Amundson et al. |
| 2007/0211002 A1 | 9/2007 | Zehner et al. |
| 2007/0211331 A1 | 9/2007 | Danner et al. |
| 2007/0223079 A1 | 9/2007 | Honeyman et al. |
| 2007/0247697 A1 | 10/2007 | Sohn et al. |
| 2007/0285385 A1 | 12/2007 | Albert et al. |
| 2008/0013155 A1 | 1/2008 | Honeyman et al. |
| 2008/0013156 A1 | 1/2008 | Whitesides et al. |
| 2008/0023332 A1 | 1/2008 | Webber et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0057252 A1 | 3/2008 | Danner et al. |
| 2008/0074730 A1 | 3/2008 | Cao et al. |
| 2008/0129667 A1 | 6/2008 | Zehner et al. |
| 2008/0130092 A1 | 6/2008 | Whitesides et al. |
| 2008/0136774 A1 | 6/2008 | Harris et al. |
| 2008/0137176 A1 | 6/2008 | Isobe et al. |
| 2008/0150888 A1 | 6/2008 | Albert et al. |
| 2008/0174853 A1 | 7/2008 | Danner et al. |
| 2008/0211764 A1 | 9/2008 | Albert et al. |
| 2008/0211765 A1 | 9/2008 | Comiskey et al. |
| 2008/0273132 A1 | 11/2008 | Hsu et al. |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicences, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Ota, I., et al., "Developments in Electrophoretic Displays", Proceedings of the SID, 18, 243 (1977).

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/Idw '01, p. 1729, Paper AMD4-4 (2001).

Zehner, R. et al., "Drive Waveforms for Active Matrix Electrophoretic Displays", SID 03 Digest, 842 (2003).

* cited by examiner

MATERIALS FOR USE IN ELECTROPHORETIC DISPLAYS

REFERENCE TO RELATED APPLICATIONS

This application claims benefit of copending Application Ser. No. 60/893,226, filed Mar. 6, 2007.

This application is related to application Ser. No. 11/160,364, filed Jun. 21, 2005 (Publication No. 2006/0007527), which is a continuation-in-part of application Ser. No. 10/906,075, filed Feb. 2, 2005 (now U.S. Pat. No. 7,079,305), which is turn is a divisional of application Ser. No. 09/683,903, filed Feb. 28, 2002 (now U.S. Pat. No. 6,866,760.

The entire contents of these copending applications, and of all other U.S. patents and published and copending applications mentioned below, are herein incorporated by reference.

BACKGROUND OF INVENTION

This invention relates to electrophoretic media and displays. More specifically, in one aspect this invention relates to an electrophoretic medium and display having improved mechanical robustness. In another aspect, this invention relates to a polymer-dispersed electrophoretic medium and display with reduced self-erasing.

Electrophoretic displays have been the subject of intense research and development for a number of years. Such displays can have attributes of good brightness and contrast, wide viewing angles, state bistability, and low power consumption when compared with liquid crystal displays. The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. (In practice, some electrophoretic displays, including some of the displays of the present invention, are capable of achieving multiple gray states, and, are stable not only in their extreme black and white optical states, but also in their intermediate gray states. Although such displays should properly be described as "multi-stable" rather than "bistable", the latter term may be used herein for convenience.) The optical property which is changed by application of an electric field is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,790; 7,236,792; 7,242,513; 7,247,379; 7,256,766; 7,259,744; 7,280,094; 7,304,634; 7,304,787; 7,312,784; 7,312,794; and 7,312,916; and U.S. Patent Applications Publication Nos. 2002/0060321; 2002/0090980; 2003/0102858; 2003/0151702; 2003/0222315; 2004/0105036; 2004/0112750; 2004/0119681; 2004/0155857; 2004/0180476; 2004/0190114; 2004/0196215; 2004/0226820; 2004/0257635; 2004/0263947; 2005/0000813; 2005/0007336; 2005/0012980; 2005/0018273; 2005/0024353; 2005/0062714; 2005/0067656; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0213191; 2005/0253777; 2005/0280626; 2006/0007527; 2006/0038772; 2006/0139308; 2006/0139310; 2006/0139311; 2006/0176267; 2006/0181492; 2006/0181504; 2006/0194619; 2006/0197737; 2006/0197738; 2006/0202949; 2006/0223282; 2006/0232531; 2006/0245038; 2006/0262060; 2006/

0279527; 2006/0291034; 2007/0035532; 2007/0035808; 2007/0052757; 2007/0057908; 2007/0069247; 2007/0085818; 2007/0091417; 2007/0091418; 2007/0097489; 2007/0109219; 2007/0128352; 2007/0146310; 2007/0152956; 2007/0153361; 2007/0200795; 2007/0200874; 2007/0201124; 2007/0207560; 2007/0211002; 2007/0211331; 2007/0223079; 2007/0247697; 2007/0285385; and 2007/0286975; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See US Patent Publication No. 2004/0226820); and other similar techniques.) Thus, the resulting display can be flexible. Further, because the display medium can be printed (using a variety of methods), the display itself can be made inexpensively.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

As discussed in the aforementioned U.S. Pat. No. 6,982,178, many of the components used in electrophoretic displays, and the methods used to manufacture such displays, are derived from technology used in liquid crystal displays (LCD's). For example, electrophoretic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with encapsulated electrophoretic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to encapsulated displays. Because the electrophoretic material is solid, it must be present between the backplane and the front electrode before these two integers are secured to each other. Furthermore, in contrast to a liquid crystal material, which is simply placed between the front electrode and the backplane without being attached to either, an encapsulated electrophoretic medium normally needs to be secured to both; in most cases the electrophoretic medium is formed on the front electrode, since this is generally easier than forming the medium on the circuitry-containing backplane, and the front electrode/electrophoretic medium combination is then laminated to the backplane, typically by covering the entire surface of the electrophoretic with an adhesive and laminating under heat, pressure and possibly vacuum.

Electro-optic displays, including electrophoretic displays, can be costly; for example, the cost of the color LCD found in a portable computer is typically a substantial fraction of the entire cost of the computer. As the use of such displays spreads to devices, such as cellular telephones and personal digital assistants (PDA's), much less costly than portable computers, there is great pressure to reduce the costs of such displays. The ability to form layers of electrophoretic media by printing techniques on flexible substrates, as discussed above, opens up the possibility of reducing the cost of electrophoretic components of displays by using mass production techniques such as roll-to-roll coating using commercial equipment used for the production of coated papers, polymeric films and similar media. However, in this type of process, it may be necessary to transport the coated medium from a commercial coating plant to the plant used for final assembly of electrophoretic displays without damage to the relatively fragile layer of electrophoretic medium.

Also, most prior art methods for final lamination of electrophoretic displays are essentially batch methods in which the electrophoretic medium, the lamination adhesive and the backplane are only brought together immediately prior to final assembly, and it is desirable to provide methods better adapted for mass production.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned 2007/0109219 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned 2007/0109219 also describes various methods designed for high volume manufacture of electro-optic displays using inverted front plane laminates; preferred forms of these methods are "multi-up" methods designed to allow lamination of components for a plurality of electro-optic displays at one time.

Electrophoretic media and displays tend to be mechanically robust, as compared with, for example, liquid crystal displays, which require transparent, typically glass, substrates on both sides of the liquid crystal medium. Several of the aforementioned E Ink patents and applications describe processes for producing electrophoretic displays in which an electrophoretic medium is coated on to a flexible plastic substrate provided with an electrically conductive layer, and the resultant electrophoretic medium/substrate sub-assembly is laminated to a backplane containing a matrix of electrodes to form the final display. Furthermore, the aforementioned U.S. Pat. No. 6,825,068 describes a backplane useful in an electrophoretic display and based upon a stainless steel foil coated with a polyimide. Such technologies can produce flexible electrophoretic displays much less susceptible to breakage than glass-based liquid crystal displays.

However, although electrophoretic displays are mechanically robust, such displays can be damaged under extreme stress, such as may occur when a portable electrophoretic display is dropped or comes into contact with a heavy object, for example in a travel bag. Typically, such failure occurs by mechanical rupture of the capsule wall, in the case of capsule-based displays, or by rupture of the continuous phase in polymer-dispersed displays. Either type of failure allows the internal phase (the electrophoretic particles and the surrounding fluid) of the electrophoretic medium to migrate within the display. Typically, a lamination adhesive layer is present adjacent the electrophoretic medium, and the fluid dissolves in this adhesive layer, leaving behind the electrophoretic particles as an optically inactive, non-switching area which causes visual defects in any image thereafter written on the display. Accordingly, there is a need to improve the mechanical robustness of electrophoretic media and displays to reduce the occurrence of such visual defects.

A second aspect of the present invention relates to reducing self-erasing (also called "kickback") in polymer-dispersed electrophoretic media and displays. Self-erasing is a phenomenon observed in some electrophoretic displays (see, for example, Ota, I., et al., "Developments in Electrophoretic Displays", Proceedings of the SID, 18, 243 (1977), where self-erasing was reported in an unencapsulated electrophoretic display) whereby, when the voltage applied across the display is switched off, the electrophoretic medium may at least partially reverse its optical state, and in some cases a reverse voltage, which may be larger than the operating voltage, can be observed to occur across the electrodes. It appears (although this invention is in no way limited by this belief) that the self-erasing phenomenon is due to a mismatch in electrical properties between various components of the display; in particular, in the case of an encapsulated electrophoretic display, it appears that the phenomenon is due to a mismatch in electrical properties between the internal phase of the microcapsules and the polymer layer, namely the microcapsule walls, which is in electrical series with this internal phase. Obviously, self-erasing is highly undesirable in that it reverses (or otherwise distorts, in the case of a grayscale display) the desired optical state of the display. It has been found that self-erasing is a particular problem in polymer-dispersed electrophoretic media and displays, and the present invention provides two different approaches to reducing self-erasing in such media and displays.

SUMMARY OF THE INVENTION

In one aspect, the present invention provides an electrophoretic medium comprising:
an electrophoretic layer comprising a plurality of discrete droplets of an internal phase in a binder, the internal phase comprising plurality of particles disposed in a fluid, the particles being capable of moving through the fluid upon application of an electric field to the medium;
a layer of a lamination adhesive; and
a polymeric layer disposed between the electrophoretic layer and the lamination adhesive layer, the polymeric layer being substantially impermeable to the fluid.

This aspect of the invention may hereinafter be referred to as the "polymeric barrier layer" medium of the invention. The electrophoretic layer in this medium may be of the capsule-based type, with each of the droplets of internal phase surrounded by a capsule wall, which is in turn surrounded by a binder. Alternatively, the electrophoretic layer may be of the polymer-dispersed type, with the droplets of internal phase being in direct contact with the binder. This aspect of the invention may also be useful in microcell electrophoretic media, in which the droplets are confined within cavities formed in a polymeric binder medium, which forms the walls of the microcells. The fluid used may be liquid or gaseous.

In another aspect, this invention provides a polymer-dispersed electrophoretic medium comprising an electrophoretic layer comprising a plurality of discrete droplets of an internal phase in a binder, the internal phase comprising plurality of particles disposed in a fluid, the particles being capable of moving through the fluid upon application of an electric field to the medium, the electrophoretic medium further comprising a layer of a complex of an alkali metal and a polymer in contact with the electrophoretic layer.

This aspect of the invention may hereinafter be referred to as the "alkali metal polymer complex" medium of the invention. The electrophoretic medium may be of the capsule-based type, polymer-dispersed type or microcell type, as previously discussed. The fluid may be liquid or gaseous.

In another aspect, this invention provides a polymer-dispersed electrophoretic medium comprising a plurality of discrete droplets of an internal phase in a binder, the internal phase comprising plurality of particles disposed in a fluid, the particles being capable of moving through the fluid upon application of an electric field to the medium, the polymer-dispersed electrophoretic medium further comprising a salt.

This aspect of the invention may hereinafter be referred to as the "ion doped" medium of the invention. The salts to be used in such a medium should dissolve in the continuous phase of the polymer-dispersed electrophoretic medium. The cations and anions of the dissolved salt should be able to separate within the continuous phase, and the separated ions should be mobile within the continuous phase. In a preferred form of such an ion doped medium, the medium is doped with a quaternary ammonium salt, preferably a tetraalkylammonium salt.

The ion doped medium of the present invention may be of the capsule-based type, polymer-dispersed type or microcell type, as previously discussed. The fluid may be liquid or gaseous.

This invention extends to an electrophoretic display comprising an electrophoretic medium of the present invention and at least one electrode arranged to apply an electric field to the electrophoretic medium. Such an electrophoretic display may further comprise voltage supply means arranged to supply voltages to the at least one electrode, the voltage supply means being arranged to drive the electrophoretic medium to a first optical state in which the medium is light transmissive and to a second optical state in which the medium is light absorbing. Such an electrophoretic display may further comprise at least one sheet of light transmissive material disposed adjacent the electrophoretic medium, so that the electrophoretic display forms a variable transmission window.

This invention also extends to a front plane laminate, double release film, or inverted front plane laminate (all as defined above) incorporating an electrophoretic medium of the present invention.

The displays of the present invention may be used in any application in which prior art electrophoretic displays have been used. Thus, for example, the present displays may be used in electronic book readers, portable computers, tablet computers, cellular telephones, smart cards, signs, watches, shelf labels and flash drives.

DETAILED DESCRIPTION

Figure 1:
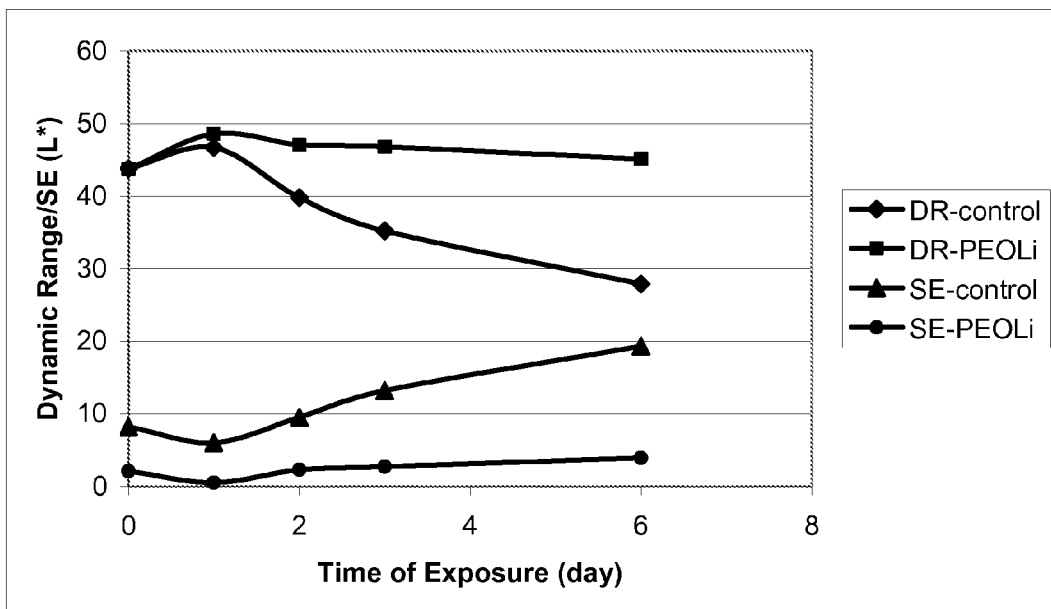
FIG. 1 is a graph showing the variation of dynamic range and self-erasing against storage time at low relative humidity obtained in certain experiments described in Example 11 below.

As already indicated, there are three principal aspects of the present invention, namely the polymeric barrier layer medium, the alkali metal polymer complex medium and the ion doped medium. These three principal aspects will mainly be described separately below, but it should be appreciated that more than one aspect of the present invention may be used in a single electrophoretic medium. For example, a single electrophoretic medium could make use of a polymeric barrier layer to provide improved mechanical robustness and an ion doped medium to provide reduced self-erasing.

Polymeric Barrier Layer Medium

As already indicated, one principal aspect of the present invention relates to electrophoretic media in which a polymeric barrier layer is provided adjacent the electrophoretic layer, between the electrophoretic layer and a lamination adhesive layer. The electrophoretic medium may be of the capsule-based or polymer-dispersed type; the invention may also be used with microcell electrophoretic media. The polymeric barrier layer should be substantially impermeable to the fluid present in the internal phase so that, even if the electrophoretic layer fails by capsule rupture or rupture of the continuous phase of a polymer-dispersed medium, the polymeric barrier layer will remain intact and maintain a barrier between the electrophoretic layer and the lamination adhesive, thus preventing or reducing the visual defects discussed above. It has also been found that the polymeric barrier layer should be thin and tough.

In a preferred form of such a polymeric barrier layer medium, the polymeric barrier layer comprises both soft and hard domains. Such polymers normally have a glass transition temperature (Tg) below ambient temperature (i.e., below about 20° C.). Due to their low glass transition temperature, the polymer chain is flexible and mobile and can absorb mechanical stress beyond its yield strength. Hard domains serve to increase strength and stiffness of the polymer and thus increase mechanical energy absorption and reduce droplet or capsule deformation.

The hard and soft domains in the polymeric barrier layer may be formed in any known manner, for example by crystallization, cross-linking or the use of polymer blends. A crystalline polymer usually has amorphous and crystalline regions. The amorphous regions of a crystalline polymer that has a low Tg are flexible and serve as soft domains whereas the crystalline regions are hard in nature. The soft and hard regions combine to give the polymer mechanical toughness so that it is neither too brittle nor too soft.

Crosslinking is another way of forming the soft and hard domains in the polymeric barrier layer. The flexible chains of a low glass transition temperature polymer can be linked to form a crosslinked network. When the density of the crosslinks reaches a certain level, a hard domain forms around crosslinking sites.

Some copolymers or polymer blends can also provide soft and hard domains. For example, an AB or ABA type of block copolymer, where block A has a high glass transition temperature and block B has a low glass transition temperature, will typically be a thermoplastic containing soft and hard domains.

The fluids used in most electrophoretic media are hydrocarbon-based. To provide a barrier layer impermeable to such fluids, and to reduce cost and for environmental reasons, the polymer used in the barrier layer will typically be a water-soluble polymer. Examples of suitable polymers include polyethylene oxide (PEO), polyethylene glycol (PEG), polypropylene oxide, poly(ethylene oxide-co-propylene oxide), poly(ethylene glycol-co-vinyl alcohol), poly(ethylene glycol-co-vinyl acetate), poly(ethylene glycol-co-acrylic acid), poly(ethylene glycol-co-acrylamide), poly(ethylene glycol-co-vinyl pyrrolidone), poly(ethylene glycol-co-methacrylic acid), and poly(ethylene glycol-co-hydroxyethyl methacrylate). Typically, the barrier polymer will have a molecular weight in the range of from about 1,000 to about 10,000,000, preferably from about 10,000 to about 1,000,000.

Polymeric barrier layer electrophoretic media can readily be prepared by methods which are well adapted for mass production. Typically, the electrophoretic medium (in the form of a capsule/binder slurry or an emulsion) is coated on to a substrate and dried. The barrier polymer is then dissolved in a solvent (typically water) and the resultant polymer solution is applied over the electrophoretic layer on the substrate by spraying, coating or any other convenient technique. The polymeric barrier layer will normally need to be dried, in air or in an oven. Alternatively a dry film of the barrier polymer (alone or coated on a release sheet) may be laminated to the substrate/electrophoretic layer sub-assembly, provided the barrier polymer adheres sufficiently to the electrophoretic layer and does not damage the electrophoretic layer. Once a substrate/electrophoretic layer/polymeric layer sub-assembly has been produced in this manner, it may be assembled into a display, directly or indirectly, in any known manner. For example, a layer of lamination adhesive can be coated over the polymeric barrier layer and the resultant sub-assembly laminated to a backplane to form the final display. Alternatively (and more commonly in industrial practice), a layer of lamination adhesive can be coated on to a release sheet, and the resultant release sheet/lamination adhesive sub-assembly laminated to the substrate/electrophoretic layer sub-assembly to form a front plane laminate, which can later be used in the assembly of an electrophoretic display. It will readily be apparent to those skilled in the manufacture of electrophoretic and other electro-optic displays that the polymeric barrier layer of the present invention can readily be provided in a double release film or inverted front plane laminate of the present invention by similar techniques.

The following Examples are now given, though by way of illustration only, to show preferred materials, conditions and techniques used in the preparation of polymeric barrier layer media and displays of the present invention.

EXAMPLE 1

Control Polymer-Dispersed Electrophoretic Display

This Example illustrates the preparation of a control polymer-dispersed electrophoretic display (i.e., one lacking a polymeric barrier layer) by a process generally similar to that described in the aforementioned U.S. Pat. No. 7,079,305.

Gelatin (6.0 g, supplied by Dynagel, Inc., 10 Wentworth Avenue, Calumet City, Ill. 60409) was dissolved in deionized water (90 mL) maintained at 50° C. in a 500 mL water-jacketed reactor equipped with a mechanical overhead stirrer. The reactor was stirred at 100 rpm and an internal phase (90 g) comprising polymer-coated titania particles and polymer-coated copper chromite particles in a hydrocarbon fluid (this internal phase being substantially as described in the paragraph bridging columns 20 and 21 of the aforementioned U.S. Pat. No. 7,002,728) was added to the reactor. After the internal phase had become fully dispersed, poly(vinyl alcohol) (291 g of a 10.3 percent solution of Kuraray Mowiol 28-99, available from Kuraray Co. Ltd, Tokyo, Japan) was added slowly to the reactor, which was maintained at 50° C. After approximately 15 minutes stirring, the jacket temperature of the reactor was lowered to 25° C., and thereafter stirring was continued for an additional 24 hours. After this time, glyoxal (22.5 g of a 40 percent solution from Aldrich) was added to the reactor with stirring.

The emulsion thus produced was coated using a slot coater with a 190 μm gap on to the ITO-coated surface of a 5 mil (127 μm) poly(ethylene terephthalate) film coated on one surface with ITO, and the resultant coating dried to form a polymer-dispersed electrophoretic medium. Separately, a polyurethane adhesive containing diglycidyl aniline as a cross-linker (see the aforementioned U.S. Pat. No. 7,173,752) was coated on to a release sheet, and laminated to the emulsion surface of the electrophoretic medium to form a front plane laminate as described in the aforementioned U.S. Pat. No. 6,982,178. The release sheet was then removed and the remaining layers of the front plane laminate laminated to the carbon-black coated surface of a PET film coated on one surface with carbon black, thus forming experimental 2 inch (51 mm) square experimental single pixel electrophoretic displays.

EXAMPLE 2

Polymer-Dispersed Electrophoretic Display with Barrier Layer

This Example illustrates the preparation of a polymer-dispersed electrophoretic display of the present invention having a poly(ethylene oxide) (PEO) barrier layer by a process similar to that of Example 1.

Example 1 was repeated except that a PEO barrier layer was provided between the electrophoretic layer and the lamination adhesive layer. To provide this barrier layer, a PEO solution was prepared by dissolving PEO (7.8 g of a PEO from Aldrich, $M_w$ about 300,000) in deionized water (92.2 mL) and coated over an electrophoretic layer formed as in Example 1 above using a bar coater with a wet gap set to 80 μm, resulting in a dried PEO layer approximately 7 μm thick. Experimental single pixel displays were then prepared as in Example 1 above.

EXAMPLE 3

Control Polymer-Dispersed Electrophoretic Display

This Example illustrates the preparation of a control polymer-dispersed electrophoretic display generally similar to that of Example 1 but using a different binder.

Gelatin (5.0 g, supplied by Dynagel, Inc.) was dissolved in deionized water (50 mL) maintained at 50° C. in a 500 mL water-jacketed reactor equipped with a mechanical overhead stirrer. The reactor was stirred at 100 rpm and the same internal phase (120 g) as in Example 1 was added to the reactor. After the internal phase had become fully dispersed, poly(vinylpyrrolidone) (8.0 g of a 20 percent solution, $M_w$ about $1.3 \times 10^6$, from Aldrich) and poly(vinyl alcohol) (310 g of a 9.2 percent solution of Kuraray Mowiol 28-99) were added slowly to the reactor, which was maintained at 50° C. After approximately 15 minutes stirring, the jacket temperature of the reactor was lowered to 25° C., and thereafter stirring was continued for an additional 24 hours. After this time, glyoxal (22.5 g of a 40 percent solution) was added to the reactor with stirring. The emulsion thus produced was then converted to experimental single pixel displays in the same way as in Example 1 above.

EXAMPLE 4

Polymer-Dispersed Electrophoretic Display with Barrier Layer

Example 3 was repeated, except that a PEO barrier layer was provided in the same way as in Example 2, the dried PEO being approximately 5 μm thick.

EXAMPLE 5

Mechanical/Electro-Optic Tests

The experimental displays prepared in Examples 1-4 above were driven to their black and white extreme optical states at ambient temperature using 500 millisecond±15 V voltage pulses with 3 seconds rest between pulses. The reflectances of the white and dark extreme optical states were measured at the end of the drive pulse and 3 seconds later (the latter being denoted by "W-3s" and "D-3s" in the Table below); the latter measurement allows for self-erasing to take place. The reflectances were converted to L* units (where L* has the usual CIE definition:

$$L^* = 116(R/R_0)^{1/3} - 16,$$

where R is the reflectance and $R_0$ is a standard reflectance value); the results are shown in Table 1 below.

TABLE 1

| Example | W (L*) | W-3s (L*) | D (L*) | D-3s (L*) |
|---|---|---|---|---|
| 1 (Control) | 68.1 | 63.6 | 25.5 | 27.4 |
| 2 | 68.0 | 64.5 | 26.5 | 27.8 |
| 3 (Control) | 72.7 | 69.4 | 23.1 | 24.2 |
| 4 | 71.8 | 69.6 | 25.1 | 25.5 |

It will be seen from Table 1 that the provision of the barrier layer in accordance with the present invention caused little or no change in the electro-optic properties of the displays.

The experimental displays were then subjected to the following mechanical tests:

Stylus

This test measures the strength of capsules or droplets (in the case of a polymer-dispersed electrophoretic medium). Specifically, the test uses a Balanced Beam Scrape Adhesion and Mar tester to impinge a weighted 1 mm diameter stylus on a test display. The weight on the stylus is systematically increased until the desired level in increments of 50 grams. The load at which 10 or more capsules or droplets beneath the stylus burst is recorded; the figure quoted is the average of three tests.

Ball Drop

This test measures the impact strength of capsules or droplets in an electrophoretic display. In this test, a stainless ball weighing 2.675 grams and having a diameter of 0.25 inch (6.3 mm) is dropped vertically from a controlled height directly on to a test display taped against a flat melamine surface. The impact site is examined using a microscope to assess the damage to the capsules or droplets. The minimum height at which the ball causes more than 10 capsules or droplets to burst is recorded; the figure quoted is the average of three tests.

Hammer

This test also measures the impact strength of capsules or droplets in an electrophoretic display. Specifically, the tester holds an impulse hammer (supplied by Dytran Instruments, Inc. Chatsworth, Calif.) with a flat circular tip 0.25 inch (6.3 mm) in diameter and hits a selected spot on the test display. The force at which the hammer impacts the display is recorded by a computer. The tester can vary the impact force manually. The smallest force that causes 10 or more capsules or droplets to burst is recorded.

Tapping

This test also measures the strength of capsules or droplets in an electrophoretic display. The test display is fixed on a horizontal plate with adhesive tape. A cone-shaped pin with a tip diameter of 1 mm is set to tap the device at a frequency of 5 taps per second. The tapping force is 300 g. The number of taps is recorded by a computer. Periodically, the test is stopped and the test display examined under a microscope. The smallest number of taps that causes 10 or more capsules or droplets to burst is recorded.

Table 2 below shows the results of these tests for the displays produced in Examples 1 to 4.

TABLE 2

| Example | Stylus (g) | Ball Drop (mm)* | Hammer (lbs. f) | Tapping (# of cycles) |
|---|---|---|---|---|
| 1 (Control) | 700 | 200 | 31.3 | 15 |
| 2 | 1050 | 200 | 38.7 | 15 |
| 3 (Control) | 700 | 20 | 12.0 | 4 |
| 4 | 1050 | 30 | 17.5 | 10 |

From Table 2 it will be seen that the provision, in Examples 2 and 4, of a barrier layer in accordance with the present invention significantly improved the mechanical properties of the electrophoretic display; it should be noted that in the ball drop test, the limit of the test applied was a 200 mm drop, so the absence of any increase in this value is not significant. Thus, these tests show that the provision of a barrier layer in accordance with the present invention increases the mechanical robustness of the display without sacrificing its electro-optic performance.

Alkali Metal Polymer Complex Medium

As already indicated, a second principal aspect of the present invention relates to reducing self-erasing in polymer-dispersed electrophoretic displays by inserting a layer of a complex of an alkali metal and a polymer in contact with the electrophoretic layer.

Polymer-dispersed electrophoretic media have certain advantages over capsule-based media. For example, the production of polymer-dispersed media tends to be simpler because it is only necessary to emulsify the internal phase in the binder and coat the resultant emulsion. Polymer-dispersed media also tend to have greater mechanical durability. However, polymer-dispersed media tend to suffer from self-erasing, especially under conditions of very low or very high relative humidity.

As mentioned above, self-erasing is a phenomenon whereby some electrophoretic media spontaneously partially reverse a change in optical state after the drive pulse which causes the change in optical state terminates. For example, if a pixel of a display is driven from black to white by a drive pulse, after the drive pulse terminates, the pixel may spontaneously change from the white optical state to a very light gray. Self-erasing is a rapid phenomenon, and should be carefully distinguished from the much slower changes in optical state caused by the finite bistability of electrophoretic and other electro-optic media. In practice, as indicated in Example 5 above, it is convenient to measure self-erasing by measuring the reflectance of the electrophoretic medium at the end of the drive pulse and again 3 seconds later, with the difference between the two readings (normally expressed in terms of L* units) being the self-erasing. The optical properties of electrophoretic media are often not symmetrical between the two extreme optical states, so these two extreme optical states may have different self-erasing values.

It has been found that polymer-dispersed electrophoretic media tend to display substantial self-erasing in conditions of very low or very high relative humidity. It is believed (although the invention is in no way limited by this belief) that the variation of self-erasing with relative humidity is due to changes in the water content of the polymer-dispersed medium. For example, in a low humidity environment, water can evaporate from the medium, thus causing self-erasing. At high relative humidity, for example 70 percent relative humidity, the medium can absorb water from the air, which changes the electro-optic properties of the medium and causes high self-erasing.

In accordance with the alkali metal polymer complex aspect of the present invention, it has been found that self-erasing in polymer-dispersed electrophoretic displays can be reduced or eliminated by inserting a layer of a complex of an alkali metal and a polymer in contact with the electrophoretic layer.

It is known that salts, for example lithium salts, can be dissolved in polar macromolecular solids to form ionically conducting polymers. One example is such an ionically conducting polymer is that formed by poly(ethylene oxide) (PEO) and lithium salts. PEO solvates the lithium cation by coordinating the ion to form a coordination complex, PEO-Li. This complex has been widely used as the key component of lightweight batteries because of its superb electrical properties.

It will be noted that PEO itself is one of the polymers which may be used as a barrier layer in the polymeric barrier layer medium of the present invention. Since the mechanical properties of, for example, the PEO-Li complex, do not differ greatly from those of PEO itself, the use of an alkali metal/polymer complex layer can serve to provide both reduced self-erasing and improved mechanical robustness to an electrophoretic medium.

The polymer used to form the alkali metal/polymer complex may be any polymer electrolyte or polymer which has the structural features necessary for complexing with alkali metals to form polymer electrolytes. Examples of such polymers are poly(ethylene oxide), poly(dimethyl siloxane), polyoxymethylene, poly(oxymethylene-oxyethylene), poly[bis-(methoxyethoxyethoxy)phosphazene], poly(propylene oxide), polyoxetane, polytetrahydrofuran, and poly(1,3-dioxolane). Typically, the polymer will have a molecular weight in the range of from about 1,000 to about 10,000,000, preferably from about 10,000 to about 1,000,000. The polymers can be reacted with alkali metal salts to form the ionically conducting complexes. There are many alkali metal salts that may be used for this purpose. The alkali metal used in forming the conductive complexes in this invention may be lithium, sodium or potassium, but lithium is preferred. Examples of suitable lithium salts are $Li_2SO_4$, $LiClO_4$, $LiN(SO_2CF_3)_2$, $LiSO_3CF_3$, and $LiBF_4$.

The alkali metal/polymer complexes used in the present invention can readily be prepared by reacting an alkali metal salt with the polymer in organic or aqueous solution; water is usually the preferred solvent for this purpose. Typically, in the preferred PEO-Li complex, the molar ratio of PEO to lithium will be in the range of about 1 to about 100, preferably about 2 to about 10 and desirably about 3 to about 8.

Incorporation of the alkali metal/polymer complex layer into a polymer-dispersed electrophoretic display can readily be effected using methods generally similar to those described above for incorporation of barrier layers. The internal phase/binder emulsion is deposited on a substrate, for example PET/ITO and dried to form a polymer-dispersed electrophoretic medium. A solution of the alkali metal/polymer complex, typically in water, is coated over the polymer-dispersed electrophoretic layer by spraying, coating or any other convenient method, and the result complex-containing layer dried in air or in an oven. Alternatively a dry film of the complex (alone or coated on a release sheet) may be laminated to the substrate/polymer-dispersed electrophoretic layer sub-assembly, provided the complex adheres sufficiently to the polymer-dispersed electrophoretic layer and does not damage this electrophoretic layer. Once a substrate/polymer-dispersed electrophoretic layer/polymer complex layer sub-assembly has been produced in this manner, it may be assembled into a display, directly or indirectly, in any known manner, conveniently in the same ways as described above for barrier layer displays. The electro-optical and mechanical properties of the displays can then be measured and evaluated.

The following Examples are now given, though by way of illustration only, to show preferred materials, conditions and techniques used in the preparation of alkali metal polymer complex media and displays of the present invention.

EXAMPLE 6

Preparation of Polymer-Dispersed Electrophoretic Medium

This Example illustrates the preparation of a polymer-dispersed electrophoretic medium by a process generally similar to that described in the aforementioned U.S. Pat. No. 7,079,305.

Gelatin (59.4 g, supplied by Dynagel, Inc.) was dissolved in deionized water (297 mL) maintained at 50° C. in a 4 L water-jacketed reactor equipped with a four-blade PTFE stirrer. The reactor was stirred at 120 rpm and the same internal phase (495 g) as in Example 1 above was added to the reactor. After the internal phase had become fully dispersed, poly(vinyl alcohol) (1188 g of a 10 percent solution of Kuraray Mowiol 28-99) was added slowly to the reactor, which was maintained at 50° C. After approximately 15 minutes stirring, the jacket temperature of the reactor was lowered to 30° C., and thereafter stirring was continued for an additional 24 hours. After this time, glyoxal (59.4 g of a 40 percent solution from Aldrich) was added slowly to the reactor with stirring, and the stirring was continued for a further 1 hour.

The emulsion thus produced was coated using a linear coater on to the ITO-coated surface of a 5 mil (127 µm) poly(ethylene terephthalate) film coated on one surface with ITO to form a polymer-dispersed electrophoretic medium. The coating weight was 31.8 g m$^{-2}$. The resultant polymer-dispersed electrophoretic medium was converted to experimental single pixel displays in the same way as in Example 1 above.

EXAMPLE 7

Preparation of poly(ethylene oxide) Solution

PEO (40 g, from Aldrich, $M_W$ about 200,000) was dissolved in de-ionized water (160 mL) to form a PEO solution having a concentration of 20%.

EXAMPLE 8

Preparation of poly(ethylene oxide)-lithium Complex

A portion (96 g) of the PEO solution prepared in Example 6 was mixed with lithium sulfate (2.0 g, from Aldrich) in a 500 mL bottle, which was placed on a rolling mill for 4 hours to form the desired complex.

EXAMPLE 9

Preparation of Control/PEO Display

The simple PEO solution prepared in Example 7 was coated over the polymer-dispersed electrophoretic layer prepared in Example 6 using a bar coater with wet gap set to 30 to 80 µm, and the resultant film dried in air to produce a dried PEO layer having a thickness of about 5 to 10 μm. The resultant polymer-dispersed electrophoretic medium was converted to experimental single pixel displays in the same way as in Example 1 above.

EXAMPLE 10

Preparation of Alkali Metal Polymer Complex Display

Example 9 was repeated, except that the PEO-Li complex solution prepared in Example 8 was used in place of the simple PEO solution prepared in Example 7. Again, the resultant polymer-dispersed electrophoretic medium was converted to experimental single pixel displays in the same way as in Example 1 above.

EXAMPLE 11

Electro-Optic Measurements

The experimental displays produced in Examples 6, 9 and 10 above were tested for their electro-optic performance under varying conditions. Since the displays of Examples 6 and 9 are both control displays, these displays are hereinafter referred to as the "Control/none" and the "Control/PEO" respectively, while the Example 10 display of the present invention is hereinafter referred to as the "PEO-Li" display. The driving method used was the same as in Example 5 above.

In a first series of tests, the experimental displays produced in Examples 6, 9 and 10 above, as originally prepared, were driven to their black and white extreme optical states and measured for self-erasing in the same way as in Example 5 above. The results are shown in Table 3 below, which shows the total self-erasing, i.e., the sum of the dark and white state self-erasing values.

TABLE 3

| Example | Description | W (L*) | W-3s (L*) | D (L*) | D-3s (L*) | Total SE (L*) |
|---|---|---|---|---|---|---|
| 6 | Control/none | 73.8 | 70.8 | 22.1 | 26.0 | 6.9 |
| 9 | Control/PEO | 74.1 | 69.6 | 23.0 | 27.8 | 9.3 |
| 10 | PEO-Li | 73.4 | 71.4 | 22.0 | 21.8 | 2.2 |

The data in Table 3 show that the presence of the PEO-Li layer effectively reduced the total self-erasing, whereas the simple PEO layer without lithium did not do so. Since the PEO-Li and simple PEO layers should have essentially the same effectiveness as humectants, the results in Table 3 indicate that the effectiveness of the PEO-Li layer in reducing self-erasing is not due to simple activity as a humectant.

In the next series of tests, the displays of Examples 6 and 10 were stored at ambient temperature but at 20 percent relative humidity for several days, and data corresponding to those shown in Table 3 collected at intervals. FIG. 1 of the accompanying drawings plots the dynamic range (i.e., the difference between the L* values of the white and dark extreme optical states, measured at the end of the drive pulse) and the total self-erasing for the Control Example 6 display and for the PEO-Li display of Example 10. From FIG. 1, it will be seen that the dynamic range of the Control display decreased rapidly on long term storage at this low humidity, whereas the dynamic range of the PEO-Li display of the present invention declined much more slowly. Furthermore, the total self-erasing of the Control display increased rapidly, whereas the total self-erasing of the PEO-Li display of the present invention was essentially constant.

Figure 2:
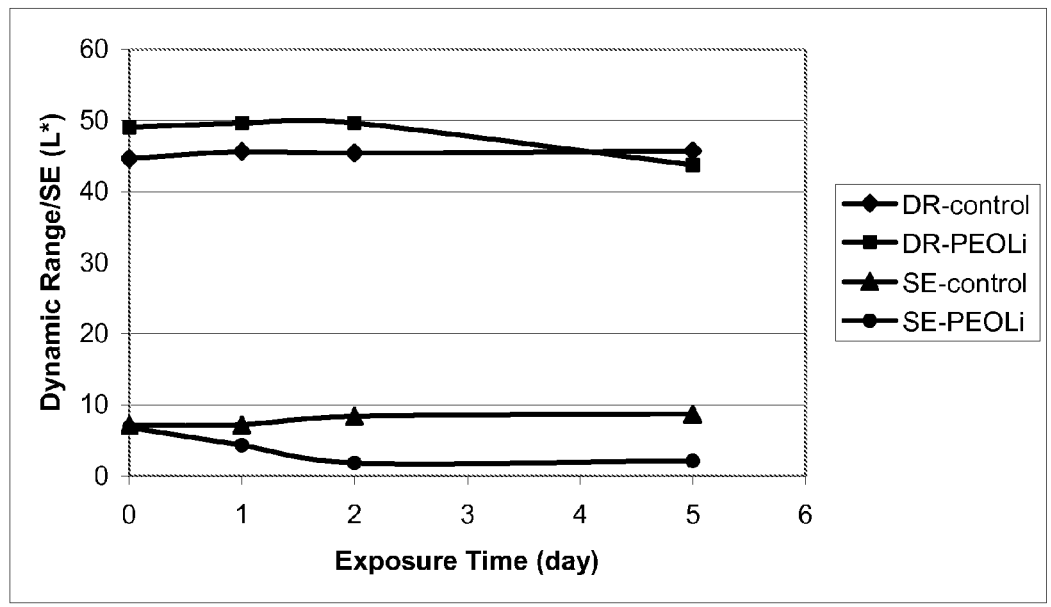
FIG. 2 is a graph similar to FIG. 1 but showing corresponding data relating to storage at high relative humidity, as described in Example 11 below.

These tests were then repeated but with storage at 70 percent relative humidity instead of 20, and the results are shown in FIG. 2 of the accompanying drawings. From this Figure, it will be seen that both displays maintained large dynamic ranges over the whole test period; although the dynamic range of the PEO-Li display of the present invention declined slightly, it remained about 45 L*, which is acceptable for practical purposes. However, the Control display showed a high, substantially constant total self-erasing of about 10 L* throughout the test period, whereas the total self-erasing of the PEO-Li display of the present invention initially decreased, presumably as a result of "conditioning" of the display in the humid environment, and thereafter remained low and constant.

Figure 3:
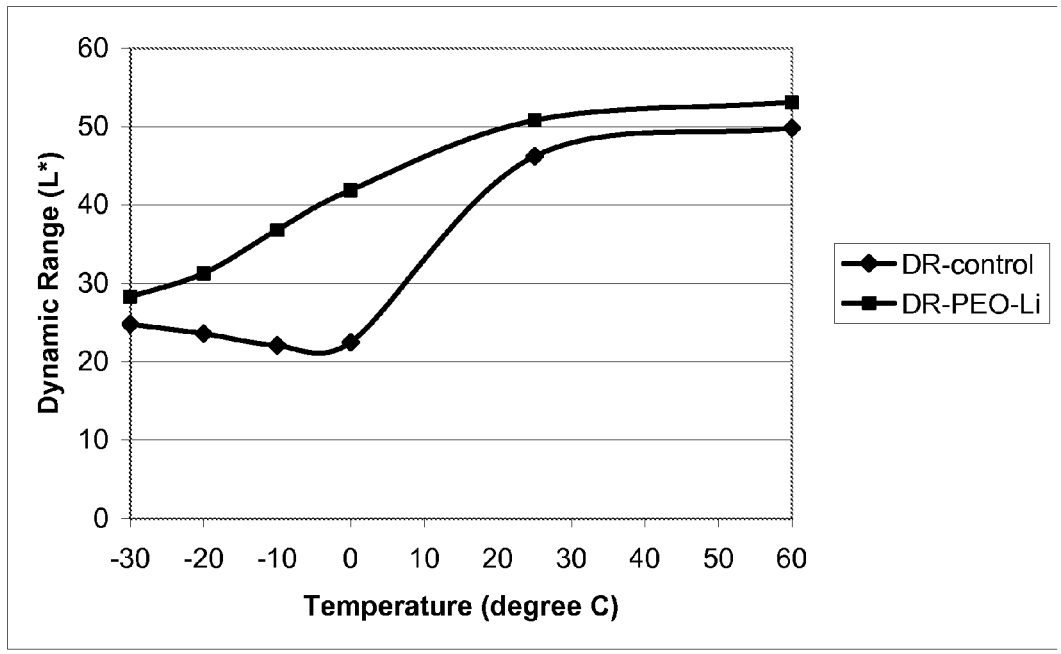
FIGS. 3 and 4 are graphs similar to FIG. 1 and show respectively the variation of dynamic range and self-erasing as a function of storage temperature, as described in Example 11 below.
Figure 4:
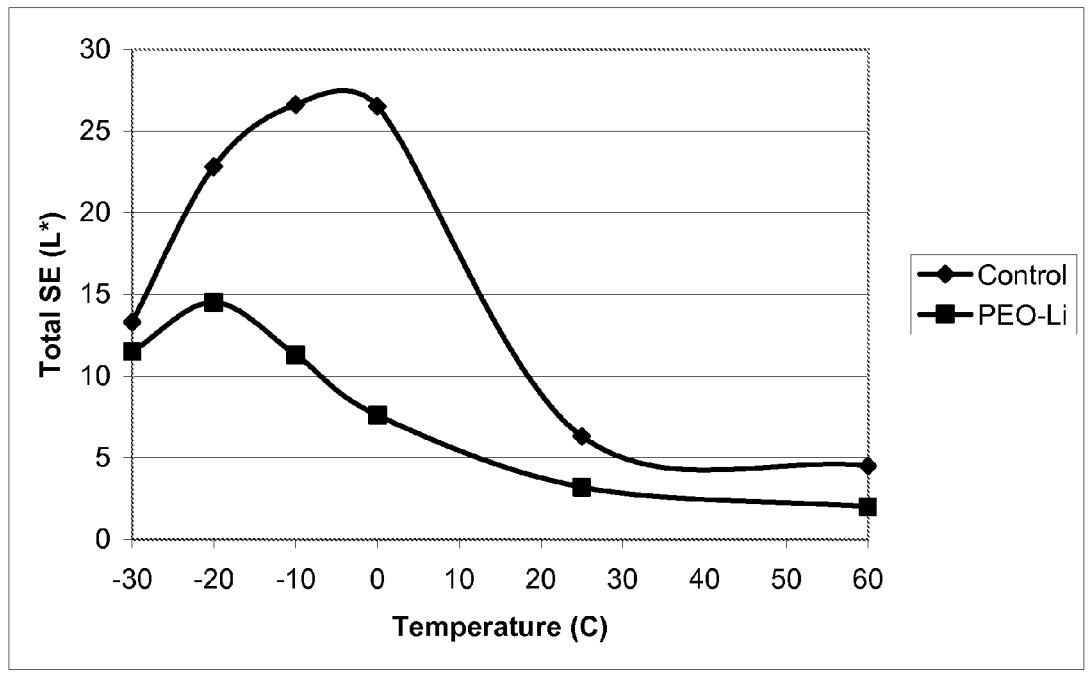

The displays of Example 6 and 10 were also tested in the same way as in the first series of tests described above (i.e., at ambient humidity) but at differing temperatures. FIG. 3 of the accompanying drawings shows the variation of the dynamic range of the two displays with temperature, while FIG. 4 shows the corresponding variation of total self-erasing. From FIG. 3, it will be seen that, although the dynamic range of both displays decreased substantially with temperature, the PEO-Li display of the present invention decreased more slowly. Using a reasonable assumption that a dynamic range of about 30 L* provides a less-than-optimum but useable image for many purposes, the display of the present invention would be useable down to about −25° C., whereas the Control display would not be useable below about 8° C. From FIG. 4, it will be seen that the display of the present invention has substantially lower total self-erasing over the entire temperature range tested, the difference being especially large over the temperature range of about 10 to about −20° C.

Previous studies by E Ink workers had found that the electro-optic performance of polymer-dispersed electrophoretic displays is very adversely affected at high and low temperatures after the displays had been exposed to a high humidity environment for several days and thus had presumably absorbed large amounts of moisture. Accordingly, the displays of Examples 6 and 10 were stored in a 70 per relative humidity chamber for 6 days, and their dynamic ranges (measured in this case after the 3 second rest period and thus after allowing self-erasing to occur) and total self-erasing values measured over the same temperature ranges as in the preceding series of tests. The results are shown in FIGS. 5 and 6 of the accompanying drawings.

Figure 5:
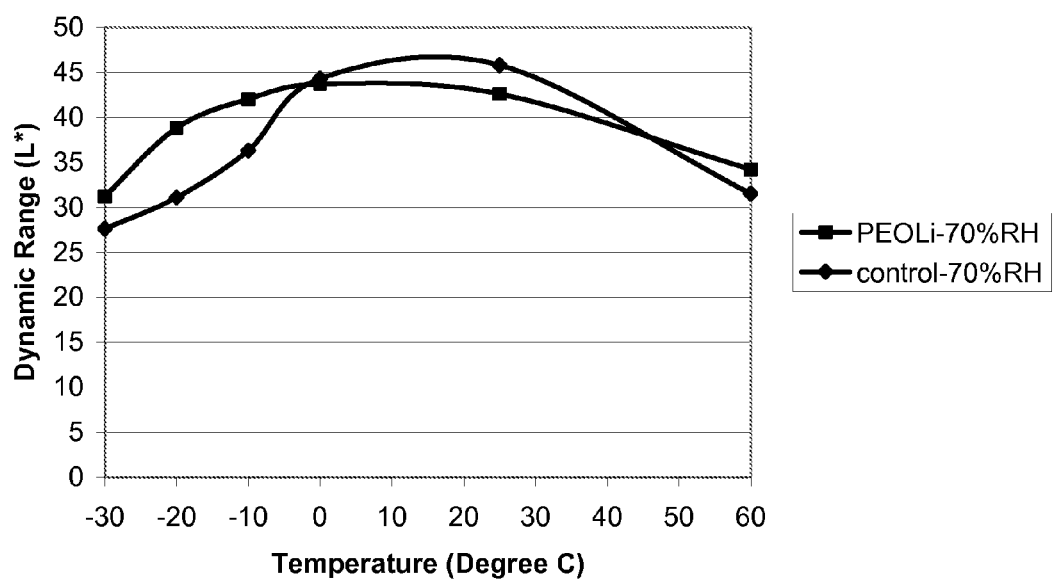
FIGS. 5 and 6 are graphs similar to those of FIGS. 3 and 4 respectively, but showing the results obtained with storage at high relative humidity, as described in Example 11 below.
Figure 6:
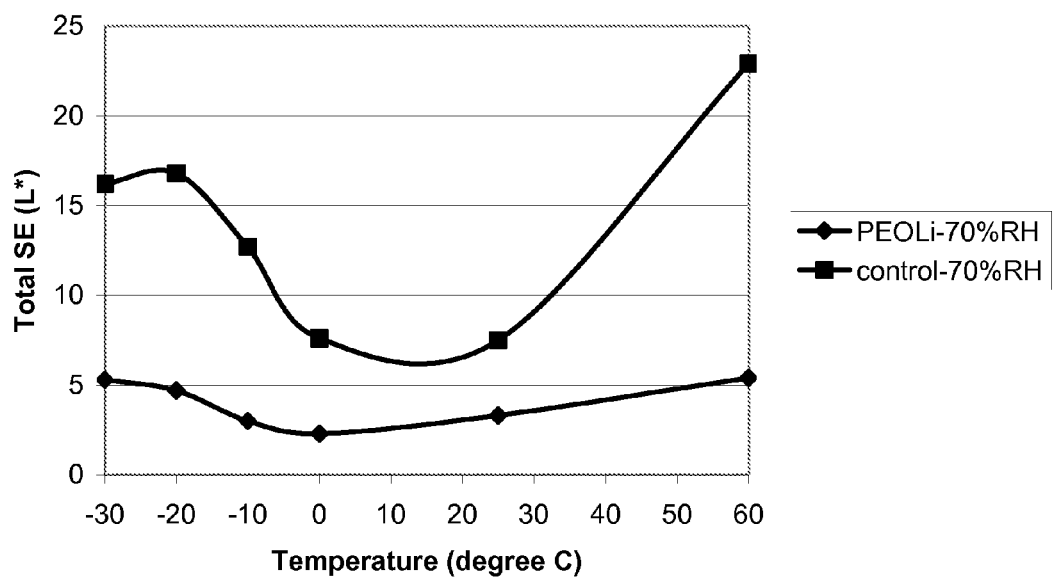

From FIG. 5, it will be seen that the display of the present invention had slightly better dynamic range than the Control display at the extremes of the temperature range tested; the PEO-Li display is approximately 3 L* better at both −30 and +60° C. More importantly, FIG. 6 shows that the total self-erasing of the display of the present invention remained acceptably low throughout the temperature range tested, not exceeding about 5 L*, whereas the total self-erasing of the Control display was totally unacceptable at the extremes of the temperature range.

From the foregoing, it will be seen that incorporation of an alkali metal/polymer complex layer into a polymer-dispersed electrophoretic display in accordance with the present invention substantially improves the electro-optic properties of the display. Total self-erasing is reduced, especially when the display is exposed to very dry or wet environments. Furthermore, the total self-erasing is still acceptable when the display is exposed to high or low temperatures, even after exposure to a wet environment. The use of an alkali metal/polymer complex layer may also be useful in capsule-based electrophoretic displays.

Ion Doped Medium

As already mentioned, in its third principal aspect this invention provides a polymer-dispersed electrophoretic medium doped with a salt.

As discussed above, although polymer-dispersed electrophoretic media possess certain advantages over other types of electrophoretic media, polymer-dispersed media tend to suffer from self-erasing, especially under conditions of very low or very high relative humidity. It has now been found that simple addition of dissolved salts to the emulsion used to prepare polymer-dispersed media can dramatically improve self-erasing in polymer-dispersed media, may reduce the time necessary to condition such media (i.e., reduce the time such media have to be stored under controlled conditions to achieve stable electro-optic properties), and may improve moisture tolerance.

Figure 7:
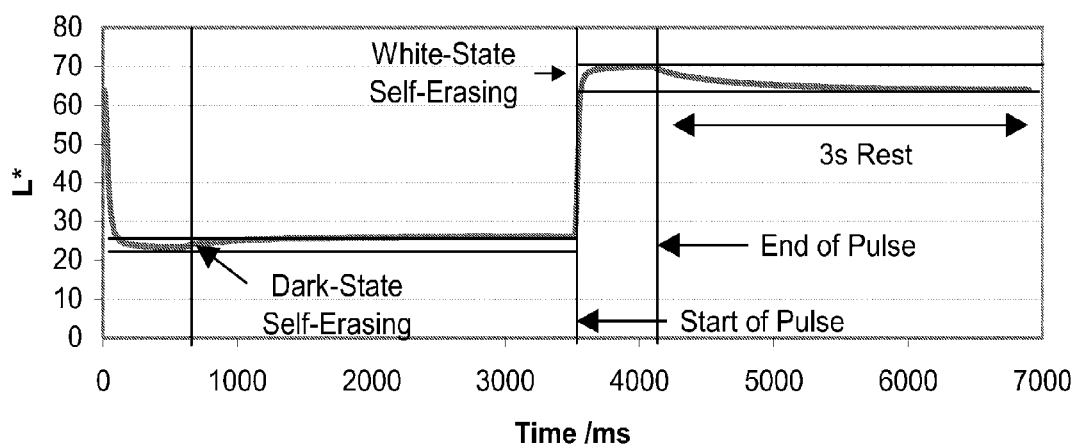
FIG. 7 is a graph showing a typical variance of reflectance with time for a prior art electrophoretic medium of the present invention being driven to its black and white extreme optical states, and illustrates the self-erasing which follows the end of each drive pulse.

FIG. 7 of the accompanying drawings shows a typical electro-optic response for a polymer-dispersed electrophoretic display driven in substantially the same manner as in Example 5 above, with a drive pulse in one direction, followed by a 3 second rest period (in which no voltage is applied across the display), a drive pulse in the opposite direction and another 3 second rest pulse. As indicated in FIG. 7, the trace shows significant self-erasing following the end of each drive pulse. To an observer of such a display, the self-erasing appears as a noticeable flicker on switching of the display.

It is believed (although the invention is in no way limited by this belief) that self-erasing may be caused, at least in part, by a mismatch in conductivity between the droplets and the continuous phase of a polymer-dispersed electrophoretic medium, and hence that incorporating salts into the continuous phase can reduce self-erasing by balancing the conductivities of the two phases. It will be evident to those skilled in the technologies of electro-optic displays that to be effective in increasing the ionic conductivities of the continuous phase that salt used must have the characteristics recited above, i.e., the salt must be reasonable soluble in the continuous phase, the cation and anion of the salt must be able to separate in the continuous phase, and the separated ions must be mobile in the continuous phase.

Figure 8:
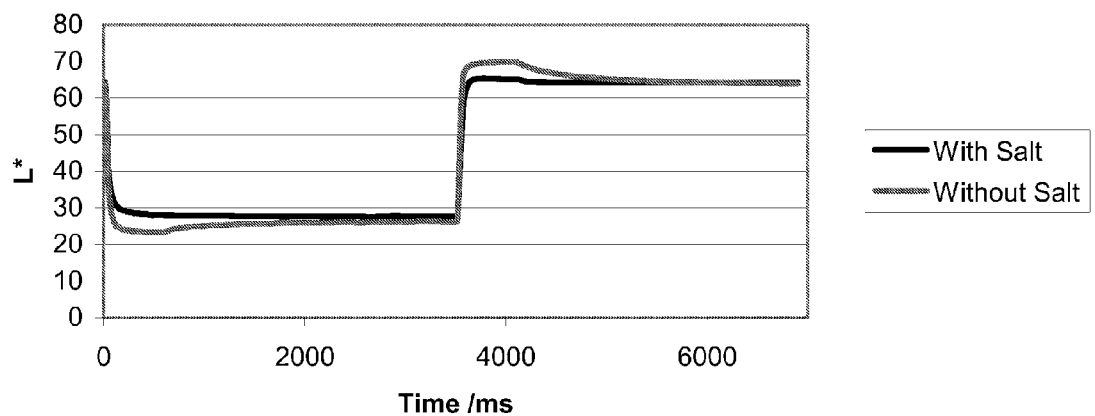
FIG. 8 is a graph similar to that of FIG. 7 but showing the reduced self-erasing achieved with an ion doped medium of the present invention.

FIG. 8 of the accompanying drawings shows a trace similar to that of FIG. 7 but taken after additional of a small amount of the salt tetrabutylammonium chloride to the emulsion used to prepare the display, the emulsion being otherwise unchanged. By comparing FIG. 8 with FIG. 7, it will be seen that addition of the salt substantially lowers the self-erasing. The exact data plotted in FIGS. 7 and 8 are as shown in Table 4 below ("WSSE" is white state self-erasing, "DSSE" is dark state self-erasing and "TSSE" is total self-erasing).

TABLE 4

| Additive | WS | WS-3s | WSSE | DS | DS-3s | DSSE | DR | TSSE |
|---|---|---|---|---|---|---|---|---|
| No Salt | 70.0 | 64.2 | 5.8 | 23.1 | 26.5 | 3.4 | 37.7 | 9.2 |
| Salt | 65.3 | 64.4 | 0.9 | 28.0 | 27.5 | 0.5 | 36.9 | 1.4 |

Thus, addition of the salt reduced the total self in this case from 9.2 L* to 1.4 L*.

Figure 9:
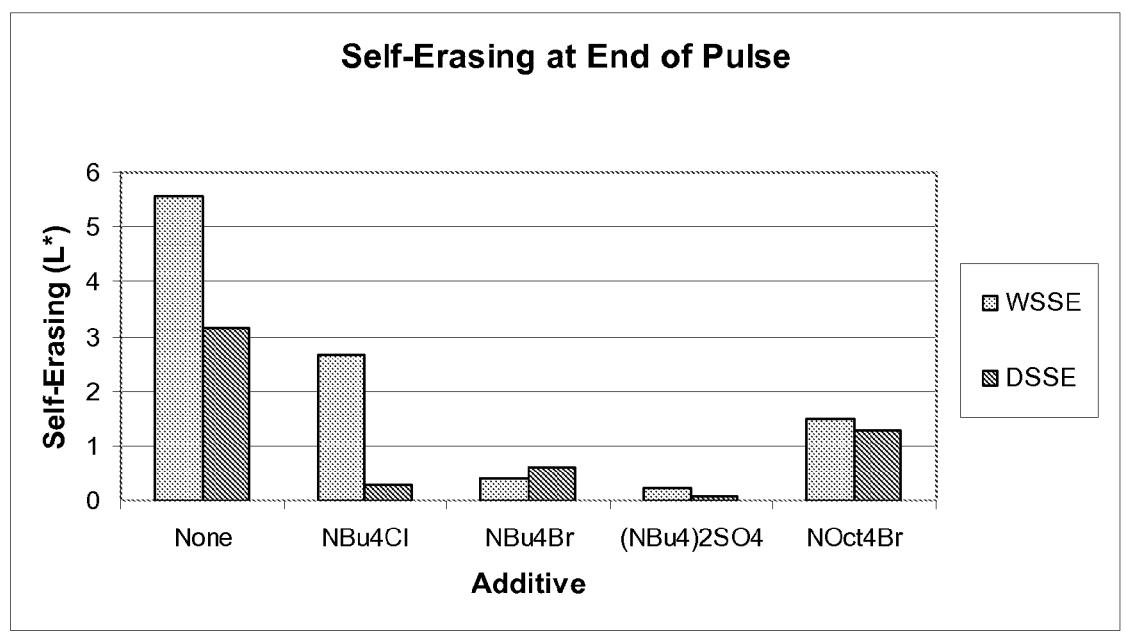
FIG. 9 is a chart showing the results obtained by using various tetraalkylammonium salts in ion doped media of the present invention.

FIG. 9 of the accompanying drawings is a chart showing the results obtained on adding various tetraalkylammonium salts to a poly(vinyl alcohol) based polymer-dispersed electrophoretic display, the materials being added in a ratio of 25 mmole/Kg of poly(vinyl alcohol), as compared to the display with no salt additive. Tetrasubstituted ammonium salts, especially tetraalkylammonium salts, are highly effective in reducing self-erasing; specific preferred salts include tetrabutylammonium halides, sulfates and hexafluorophosphates. Useful amounts of the salt were found to be from about 10 to about 1000 millimoles of additive per kilogram of binder, with the optimum amount usually being with the range of from about 10 to about 25 millimoles of additive per kilogram of binder. These salts are non-toxic and only small quantities are required. However, the concentration of salt required can be reduced by controlling the particle size of the salt, as described below.

The salts and other ionic species used in the present invention can readily be incorporated into the emulsions used to prepared polymer-dispersed electrophoretic displays. In a typical procedure, to an emulsion of an internal phase in a poly(vinyl alcohol) based binder is added a sufficient quantity of a 0.1 mmolar aqueous solution of tetrabutylammonium chloride to give a salt concentration of 25 mmole per kilogram of poly(vinyl alcohol). The salt is allowed to mix with the emulsion for at least 15 minutes, and the emulsion is then coated, dried and formed into the final display.

It has been found important to control the size of the salt crystals added to the electrophoretic medium. The preferred tetrabutylammonium hexafluorophosphate (TBAHFP) salt is extremely hydrophobic and tends to flocculate in water and aqueous media rather than dispersing or dissolving. Since liquids used in polymer-dispersed electrophoretic media are typically hydrocarbon-based, as noted above, the polymers used in the continuous phase are typically hydrophilic, and may include for example gelatin and poly(vinyl alcohol). It has been found advantageous to include polyvinylpyrrolidone (PVP) in the continuous phase when using the preferred TBAHFP salt, since the PVP acts as a surface active agent and assists in dispersing the TBAHFP throughout the continuous phase; the PVP molecules keep the salt crystals dispersed in the continuous phase and prevent them from flocculating.

Typical commercial forms of TBAHFP have crystal sizes in the range of about 100 to about 1000 µm. Adding such large crystals directly to the continuous phase results in ineffective use of the salt, with the need to include a relatively large proportion of the salt (around 10-25 mmole/Kg of continuous phase), which (it has been found) adversely affects the dynamic range of the electrophoretic medium, although it does reduce self-erasing. Furthermore, since the droplets of internal phase present in the electrophoretic medium are typically of the order of 30-50 µm, the salt crystals are substantially larger than the droplets are the crystals themselves can give rise to noticeable visual defects in coated films.

It has been found that, by grinding TBAHFP (or other salt additive) down to an average crystal size below about 5 µm, and preferably around 4 µm, the amount of salt required is reduced, visual defects in the coated films are avoided, and the self-erasing experienced by the electrophoretic medium is reduced without any negative effect on its dynamic range. The necessary reduction in crystal size can readily be effected using conventional apparatus. For example, one specific process which has been found to give good results is mixing TBAHFP (50 g) with a PVP solution (75 g of a 1 percent solution) in an attritor, and adding 250 mL of 2 mm zirconium beads. The attritor is then operated at 600 rpm for one hour, then turned off and its contents poured into another container, where the dispersion is vacuum-filtered to separate it from the grinding beads. Following filtration, the dispersion is made more fluid by adding an equal volume of additional 1 percent PVP solution, thus reducing the salt concentration from 40 to 20 percent. Following this grinding and dilution procedure, it was found that the average size of the TBAHFP crystals had been reduced to about 4 µm. Such small crystals are an order of magnitude smaller than the droplets of internal phase and do not give rise to visible defects in coated films; it is believed (although the invention is in no way limited by this belief) that such small crystals can lie concealed in the interstitial spaces between packed internal phase droplets in a coated film to the electrophoretic medium. The salt is conveniently added simultaneously with the cross-linker, such a glyoxal, which is typically added at the end of the emulsification process, as described in the patents and application mentioned in the Reference to Related Applications Section above.

It has been found that, with the average crystal size reduced by about 4 µm by the procedure described above, the concentration of TBAHFP needed to achieve substantial reduction in self-erasing without significant effect on dynamic range can be greatly reduced; salt concentrations in the range of about 5 to 500 µmole of TBAHFP per kilogram of poly(vinyl alcohol) (measured on a solids basis) have been found to give good results, with the optimum salt concentration typically being about 50 µmole of TBAHFP per kilogram of poly(vinyl alcohol).

EXAMPLE 12

Effect of Salts on Dynamic Range and Self-Erasing

Tetrabutylammonium chloride, iodide and hexafluorophosphate were added to a poly(vinyl alcohol) based emulsion containing essentially the same internal phase as used in Example 1 above at a concentration of 25 mmole/Kg of poly(vinyl alcohol), and the resultant emulsions coated, dried and formed into displays substantially as described in Example 6 above. Control displays were also prepared with no salt additive. Separate sets of displays thus produced were placed in 30 and 80 percent relative humidity environments and the dynamic range and total self-erasing of the displays were measured in the same way as in Example 11 above. The results are shown in Table 5 below; all data are in L* units.

TABLE 5

| | Additive | | | | | | | |
|---|---|---|---|---|---|---|---|---|
| | None | | NBu$_4$Cl | | NBu$_4$I | | NBu$_4$PF$_6$ | |
| RH - Days | DR | TSSE | DR | TSSE | DR | TSSE | DR | TSSE |
| 30% - 0 Days | 40.6 | 6.2 | 35.9 | 3.1 | 31.8 | 1.5 | 39.5 | 2.4 |
| 30% - 1 Days | 36.5 | 4.1 | 37.4 | 3.8 | 32.3 | 1.9 | 36.2 | 2.5 |
| 30% - 2 Days | 36.1 | 5.4 | 36.7 | 4.7 | 29.2 | 3.3 | 36.4 | 4.2 |
| 80% - 0 Days | 40.6 | 6.2 | 35.9 | 3.1 | 31.8 | 1.5 | 39.5 | 2.4 |
| 80% - 1 Days | 33.4 | 6.8 | 38.8 | 3.7 | 33.1 | 1.7 | 40.4 | 3.1 |
| 80% - 2 Days | 29.5 | 8.6 | 33.0 | 2.0 | 27.4 | 2.5 | 39.9 | 4.1 |

As noted above, polymer-dispersed electrophoretic displays tend to show increased self-erasing in very dry or moist environments, thus reducing the dynamic range of the displays. Addition of salts may provide a barrier to moisture ingress or egress, thus improving the humidity tolerance of the polymer-dispersed electrophoretic displays. The control displays included in Table 5 show this behavior; note especially the rapid decrease in the dynamic range of the control display at 80 percent relative humidity, and the parallel increase in total self-erasing. All of the displays of the invention reduce the loss in dynamic range, with the tetrabutylammonium hexafluorophosphate essentially preventing any loss of dynamic range at all. All of the displays of the invention also significantly reduced the total self-erasing, as compared with the controls; note that in no case did the total self-erasing of a display of the invention exceed 5 L*.

The alkali metal/polymer complex and ion doped medium aspects of the present invention are both intended to reduce self-erasing, and hence maintain dynamic range in polymer-dispersed electrophoretic displays. These two aspects of the present invention may be combined in a single display, and may provide better results than either approach alone.

Numerous changes and modifications can be made in the preferred embodiments of the present invention already described without departing from the scope of the invention. Accordingly, the foregoing description is to be construed in an illustrative and not in a limitative sense.

The invention claimed is:

1. An electrophoretic display comprising, in this order:
a first electrode;
an electrophoretic layer comprising a plurality of discrete droplets of an internal phase in a binder, the internal phase comprising plurality of particles disposed in a fluid, the particles being capable of moving through the fluid upon application of an electric field to the medium;
a layer of a lamination adhesive; and
a second electrode;
the display further comprising a polymeric layer disposed between the electrophoretic layer and the lamination adhesive layer, the polymeric layer being substantially impermeable to the fluid.

2. An electrophoretic display according to claim 1 wherein the electrophoretic layer is of the capsule-based type, with each of the droplets of internal phase being surrounded by a capsule wall, which is in turn surrounded by the binder.

3. An electrophoretic display according to claim 1 wherein the electrophoretic layer is of the polymer-dispersed type, with the droplets of internal phase being in direct contact with the binder.

4. An electrophoretic display according to claim 1 wherein the electrophoretic layer is of the microcell type with the droplets confined within cavities formed in a polymeric binder medium, which forms the walls of the microcells.

5. An electrophoretic display according to claim 1 wherein the fluid is gaseous.

6. An electrophoretic display according to claim 1 wherein the polymeric layer comprises a mixture of hard and soft domains.

7. An electrophoretic display according to claim 1 wherein the polymeric layer comprises a water-soluble polymer.

8. An electrophoretic display according to claim 7 wherein the polymeric layer comprises any one or more of polyethylene oxide, polyethylene glycol, polypropylene oxide, poly (ethylene oxide-co-propylene oxide), poly(ethylene glycol-co-vinyl alcohol), poly(ethylene glycol-co-vinyl acetate), poly(ethylene glycol-co-acrylic acid), poly(ethylene glycol-co-acrylamide), poly(ethylene glycol-co-vinyl pyrrolidone), poly(ethylene glycol-co-methacrylic acid), and poly(ethylene glycol-co-hydroxyethyl methacrylate).

9. An electrophoretic display according to claim 7 wherein the water-soluble polymer has a molecular weight in the range of from about 1,000 to 10,000,000.

10. An electrophoretic display according to claim 9 wherein the water-soluble polymer has a molecular weight in the range of from about 10,000 to 1,000,000.

11. An electronic book reader, portable computer, tablet computer, cellular telephone, smart card, sign, watch, shelf label or flash drive comprising a display according to claim 1.

12. A front plane laminate comprising in order: a light-transmissive electrically-conductive layer; a layer of a solid electrophoretic medium in electrical contact with the electrically-conductive layer, the electrophoretic medium comprising a plurality of discrete droplets of an internal phase in a binder, the internal phase comprising a plurality of particles disposed in a fluid, the particles being capable of moving through the fluid upon application of an electric field to the medium; a polymeric layer substantially impermeable to the fluid; an adhesive layer; and a release sheet.

13. A double release film comprising:

a layer of a solid electrophoretic medium comprising a plurality of discrete droplets of an internal phase in a binder, the internal phase comprising a plurality of particles disposed in a fluid, the particles being capable of moving through the fluid upon application of an electric field to the medium, the layer of solid electrophoretic medium having first and second surfaces on opposed sides thereof;

a first adhesive layer on the first surface of the layer of solid electrophoretic medium;

a release sheet disposed on the opposed side of the first adhesive layer from the layer of solid electrophoretic medium;

a second adhesive layer on the second surface of the layer of solid electrophoretic medium; and a polymeric layer substantially impermeable to the fluid disposed between the solid electrophoretic medium and one of the first and second adhesive layers.

14. An inverted front plane laminate for use in forming an electrophoretic display, the inverted front plane laminate comprising, in order:

at least one of a light-transmissive protective layer and a light-transmissive electrically-conductive layer;

an adhesive layer;

a polymeric layer;

a layer of a solid electrophoretic medium a plurality of discrete droplets of an internal phase in a binder, the internal phase comprising a plurality of particles disposed in a fluid, the particles being capable of moving through the fluid upon application of an electric field to the medium; and a release sheet, wherein the polymeric layer is substantially impermeable to the fluid.

* * * * *

UNITED STATES PATENT AND TRADEMARK OFFICE
CERTIFICATE OF CORRECTION

PATENT NO.         : 7,826,129 B2
APPLICATION NO.    : 12/043472
DATED              : November 2, 2010
INVENTOR(S)        : Wu et al.

Page 1 of 1

It is certified that error appears in the above-identified patent and that said Letters Patent is hereby corrected as shown below:

Front page, amend Section (75) to read as follows:

(75) Inventors: Wu; Bin (Sharon, MA), Honeyman; Charles Howie (Roslindale, MA), Harris; George G. (Woburn, MA)

Signed and Sealed this
Twenty-third Day of October, 2012

David J. Kappos
*Director of the United States Patent and Trademark Office*